UNITED STATES PATENT OFFICE.

EDWIN L. ORMSBEE, OF CLEVELAND, OHIO.

SUBSTANCE FOR MOUNTING STUFFED BIRDS, &c.

SPECIFICATION forming part of Letters Patent No. 227,291, dated May 4, 1880.

Application filed November 15, 1879.

*To all whom it may concern:*

Be it known that I, EDWIN L. ORMSBEE, of Cleveland, in the county of Cuyahoga and State of Ohio, have invented a new and useful Improvement in Substances for Mounting Birds, &c.; and I do hereby declare that the following is a full and exact description of the same.

My invention is designed to provide a substance for imitating branches, twigs, bits of wood, &c., to be used in taxidermy, or mounting stuffed birds, animals, and insects, or in any way in which it is found desirable to use natural branches.

It consists of wire covered with cloth or other suitable material, the wire being bent to imitate the natural branch in any form or direction desired. The cut edges, ends, or knots in the wood are represented by pieces of cork. Upon this basis is spread an admixture of glue, sand or sawdust, and Marseilles green, in the proportion of about equal parts of each substance. This is put on and while hot or in a semi-fluid state. It soon hardens, and can then be touched with colors, as desired, to imitate moss, lichens, &c., thus representing the natural wood.

The chief advantages of my invention are, that it can be bent in any shape and made of any size to conform to the size of the bird or animal to be mounted.

The result of my process is a durable and satisfactory substitute for natural woods, &c., upon which to mount stuffed subjects of natural history.

Having thus described my invention, what I claim as new, and desire to secure by Letters Patent, is—

The composition herein described for imitating wood for taxidermical purposes, composed of an admixture of glue, sand or sawdust, and Marseilles green, in about equal proportions, when compounded substantially as described and shown.

This specification signed and witnessed this 11th day of October, 1879.

E. L. ORMSBEE.

Witnesses:
G. C. TRACY,
W. HANNA.